United States Patent [19]

Ikari

[11] Patent Number: 5,299,421
[45] Date of Patent: Apr. 5, 1994

[54] DEVICE FOR CONTROLLING VARIABLE CAPACITY MOTOR OF HYDRAULIC DRIVE VEHICLE

[75] Inventor: Masanori Ikari, Kawagoe, Japan

[73] Assignees: Kabushiki Kaisha Komatsu Seisakusho; Komatsu Mec Kabushiki Kaisha, both of Tokyo, Japan

[21] Appl. No.: 778,922

[22] PCT Filed: Jun. 8, 1990

[86] PCT No.: PCT/JP90/00747

§ 371 Date: Dec. 4, 1991

§ 102(e) Date: Dec. 4, 1991

[87] PCT Pub. No.: WO90/15270

PCT Pub. Date: Dec. 13, 1990

[30] Foreign Application Priority Data

Jun. 9, 1989 [JP] Japan .................. 1-145057
Oct. 16, 1989 [JP] Japan .................. 1-119729

[51] Int. Cl.$^5$ ............................................. F16D 31/02
[52] U.S. Cl. ................................. 60/444; 60/465; 60/494
[58] Field of Search ............. 60/431, 443, 444, 445, 60/452, 448, 451, 468, 490, 491, 492, 493, 494

[56] References Cited

U.S. PATENT DOCUMENTS

| | | | |
|---|---|---|---|
| 3,579,979 | 5/1971 | Bosch | 60/491 |
| 3,886,742 | 6/1975 | Johnson | 60/490 X |
| 3,986,358 | 10/1976 | Hoffmann | 60/490 X |
| 4,399,886 | 8/1983 | Pollman | 180/197 |
| 4,530,416 | 7/1985 | Kassai | 60/490 X |
| 4,546,847 | 10/1985 | Abels | 60/492 X |
| 4,554,991 | 11/1985 | Eden | 60/468 X |
| 4,679,396 | 7/1987 | Heggie | 60/491 X |
| 4,858,435 | 8/1989 | Ikeda | 60/490 X |
| 5,018,351 | 5/1991 | Otte | 60/492 X |
| 5,092,153 | 3/1992 | Ikari | 74/880 |

FOREIGN PATENT DOCUMENTS

| | | |
|---|---|---|
| 45-39365 | 12/1970 | Japan . |
| 57-127156 | 8/1982 | Japan . |
| 57-134063 | 8/1982 | Japan . |
| 61-8307 | 3/1986 | Japan . |
| 62-13543 | 3/1987 | Japan . |
| 2-65757 | 5/1990 | Japan . |

OTHER PUBLICATIONS

English translation of claim for Japanese Patent Publication No 62-13543 dated Mar. 27, 1987 (1 page).

*Primary Examiner*—Edward K. Look
*Assistant Examiner*—Hoang Nguyen
*Attorney, Agent, or Firm*—Flynn, Thiel, Boutell & Tanis

[57] ABSTRACT

A device for controlling the variable capacity motor incorporated in a hydraulic drive vehicle, wherein a control valve for reducing the oil pressure for controlling the motor is provided to pilot hydraulic piping extending from a control pump or controlling the capacity of the motor, and changeover valves are provided for performing changeover between operation and non-operation of the pressure reduction valve. The above structure serves to control the minimum capacity of the variable capacity hydraulic motor while reducing the pressure of pilot oil introduced from the control pump and, when a pressure in the main circuit exceeds a preset value, the changeover valves operate even when the pressure reduction valve is in operation so as to cancel such operation for continuously controlling the vehicle.

4 Claims, 18 Drawing Sheets

DEVICE FOR CONTROLLING VARIABLE CAPACITY MOTOR OF HYDRAULIC DRIVE VEHICLE

TECHNICAL FIELD

The present invention relates to a device for controlling a variable capacity motor incorporated in an industrial vehicle provided with shovel loader etc., and particularly to the device which is effectively incorporated in an infinite variable-speed hydraulic drive vehicle in which the maximum traveling speed of the vehicle should be controlled in response to a working condition.

BACKGROUND TECHNOLOGY

Illustrated in FIG. 12 is a conventional hydraulic circuit of an infinite variable-speed hydraulic drive vehicle which has a variable capacity hydraulic pump 1 and a motor 2. In the same figure, a part of the output of an engine 5 drives a working machine hydraulic pump 4 and acts upon a working machine hydraulic cylinder 52 by way of a working machine hydraulic circuit 51. Remaining output of the engine 5 drives the control pump 3 and a hydraulic pump 1 in which oil pressure is generated. The oil pressure thus generated at the hydraulic pump 1 flows through main circuits 24 and 25, rotates the variable capacity motor 2, thereby forming a driving force.

Designated at 6 is a pump control valve for controlling the capacity of the hydraulic pump 1, 7 is a pump capacity control cylinder, 8, 8 are main relief valves and 10 is a filter. Oil under pressure, which flows from the pump control valve 6 to the motor control oil line 11, is introduced into one end of the motor control valve 14, whereby the oil introduced into the motor control valve 14 operates to introduce the oil under high pressure, which is introduced by a pilot hydraulic piping 16 from the main circuits 24 and 25, into a motor capacity control cylinder 31.

That is, the pump capacity control cylinder 7 and the motor capacity control cylinder 31 are controlled by the pump control valve 6 and the motor control valve 14 so that the capacity of the pump 1 and the capacity of the hydraulic motor 2 are arbitrarily varied, thereby varying the traveling speed of the vehicle.

A graph representing a traveling performance curve of the conventional hydraulic drive vehicle, as explained in FIG. 12, will be described with reference to FIG. 13. As illustrated in the same figure, in the infinite variable-speed hydraulic drive vehicle having the conventional variable capacity hydraulic motor, both the traveling driving force and the traveling speed are continuously varied so that they are automatically and continuously varied without changing operation from the maximum driving force (traveling speed is 0) to the maximum speed. Accordingly, since the driver can control the traveling speed and the driving force, it is possible to travel the vehicle easier than a vehicle provided with a mechanical speed change gear.

The conventional hydraulic drive vehicle has an advantage that the traveling operation is easy. However, in the industrial vehicle provided with a loading apparatus such as a shovel loader, the working machine pump 4 of the loader is also driven by the engine in the same way as the hydraulic drive pump 1. Since the maximum rising speed of the loader is proportional to the engine speed, the rising speed of the loader is also controlled by the travel of the accelerator pedal in the same way as the traveling speed. Accordingly, in case that the hydraulic drive vehicle travels while raising the loader at the working site, the working efficiency is improved, when the loader rises at the maximum speed and the vehicle travels at low speed. However, there was such a serious problem that when the loader rises at the maximum speed, the traveling speed at the same time increases at the maximum. This problem will be described with reference to FIG. 14 which depend on the engine speed of the engine 5. $Pst1''$, ... $Pst5''$ represent pressures of pilot hydraulic piping 15. The relation between the capacity of the motor (horizontal axis) and the pressure $P_H''$ (vertical axis) in the main hydraulic circuits 24 and 25 is varied by the pilot pressures $Pst1''$ ... $Pst5''$. In case that the traveling speed is accelerated at full throttle so as to rise the loader at the maximum speed, as the pilot pressure rises to $Pst1''$ and thereafter the traveling load decreases, the pressure $P_H''$ decreases as the traveling load decreases. At this time, the traveling speed increases as the capacity of the motor moves along the characteristic line of the pilot pressure and reaches the minimum. At this time, the traveling speed reaches the maximum speed, which causes a problem at the working site having a small traveling range.

To solve the matching problem between the traveling speed and the rising speed of the loader, the multiple speed gear change method is conventionally employed wherein the maximum traveling speed is reduced while the capacity of the motor is fixed to be the maximum or the mechanical speed change gear is connected to the motor. However, there was a problem in the former in that the traveling speed is limited to the low speed since the capacity of the motor is fixed as illustrated in FIG. 15 and a problem in the latter in that the device cannot match exactly with the working condition since the maximum driving force is not obtained at high range as illustrated in FIG. 16. To solve these problems, the applicant proposed a means, which is disclosed in Japanese Utility Application No. 63-144985 (and corresponding U.S. Pat. No. 5,092,153) and is provided with a means which is capable of operating to control the minimum capacity of the variable capacity hydraulic motor, thereby continuously controlling the maximum traveling speed in response to the oil pressure in the high pressure side of the main circuit which is connected to the variable capacity hydraulic motor of the hydraulic pump and the pilot oil pressure from the control pump which operates the motor capacity control cylinder for controlling the capacity of the variable capacity hydraulic motor. A motor control valve 14 of this device, as disclosed in Japanese Utility Model Application No. 63-144985, controls the motor control oil pressure by balancing the control oil pressure with the main circuit oil pressure, but it had the following problems:

(1) The motor control oil pressure is liable to vary by the variation of the main circuit oil pressure which is caused by the control of the traveling speed.

(2) The structure is complex and rather expensive.

It is therefore an object of the present invention to solve these problems of the conventional device and to provide a device for controlling the variable capacity motor which is simple in structure and low in cost and has a traveling characteristic which is not influenced by the variation of the main circuit oil pressure.

DISCLOSURE OF THE INVENTION

To achieve the above object, the present invention is to provide a device for controlling the variable capacity motor incorporated in a hydraulic drive vehicle, wherein a means for reducing the oil pressure for controlling the motor is provided to pilot hydraulic piping from a control pump for controlling the capacity of the variable capacity motor, and solenoid changeover valves are provided for performing changeover between operation and non-operation of the pressure reduction means.

The device having such an arrangement serves to continuously control the minimum capacity of the variable capacity hydraulic motor while reducing the pressure of pilot oil introduced from the control pump. When the pressure in the main circuit exceeds a preset value, the changeover valves operate, even when the pressure reduction means is in operation, so as to control to cancel the operation of the pressure reduction means for continuously controlling the maximum traveling speed.

DETAILED DESCRIPTION

Embodiments of the present invention will be described with reference to FIGS. 1 to 11.

Figure 1A:
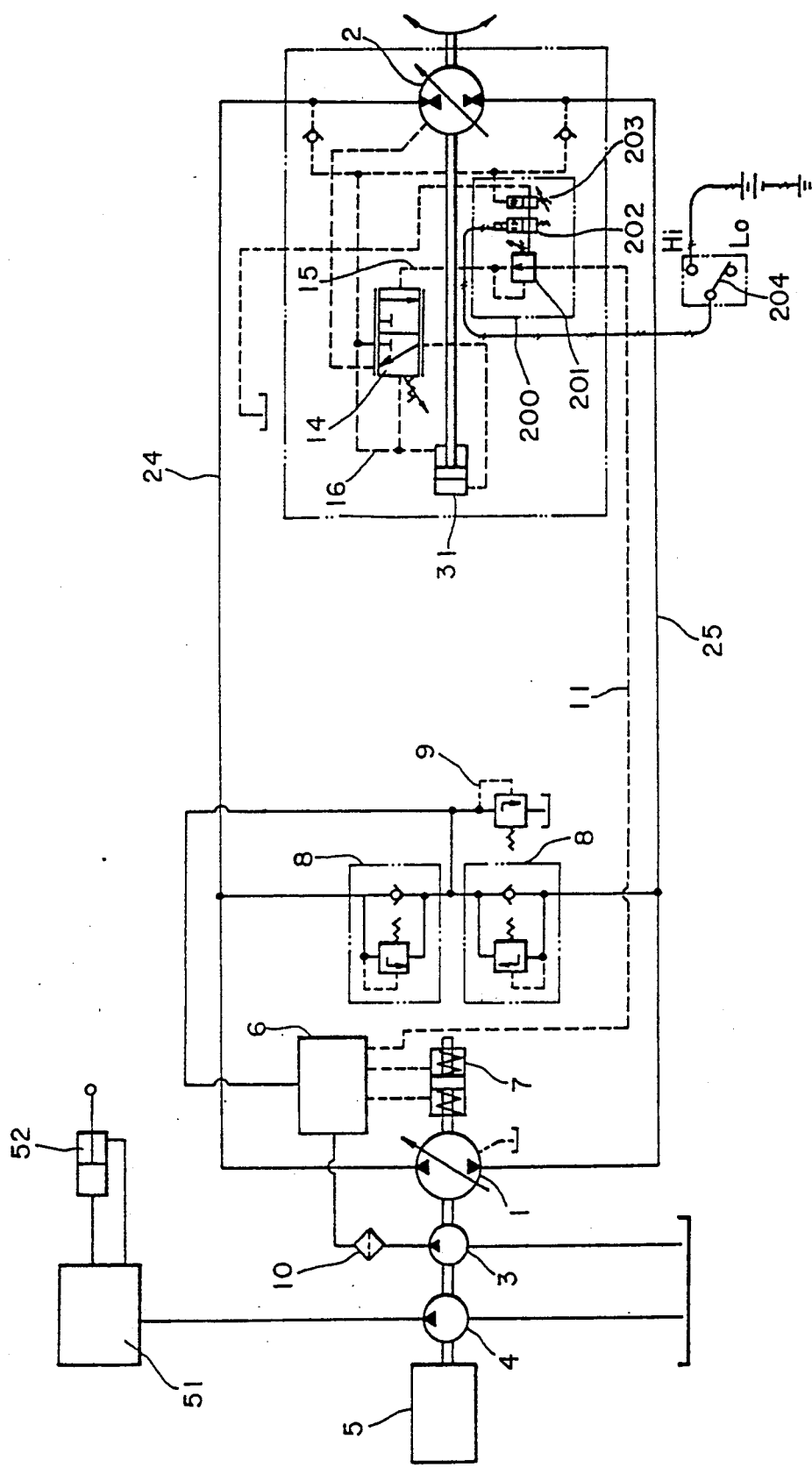
FIG. 1(a) is a hydraulic circuit diagram of an infinite variable-speed hydraulic drive vehicle employing a variable capacity hydraulic pump and a motor according to an embodiment of the present invention.
Figure 12:
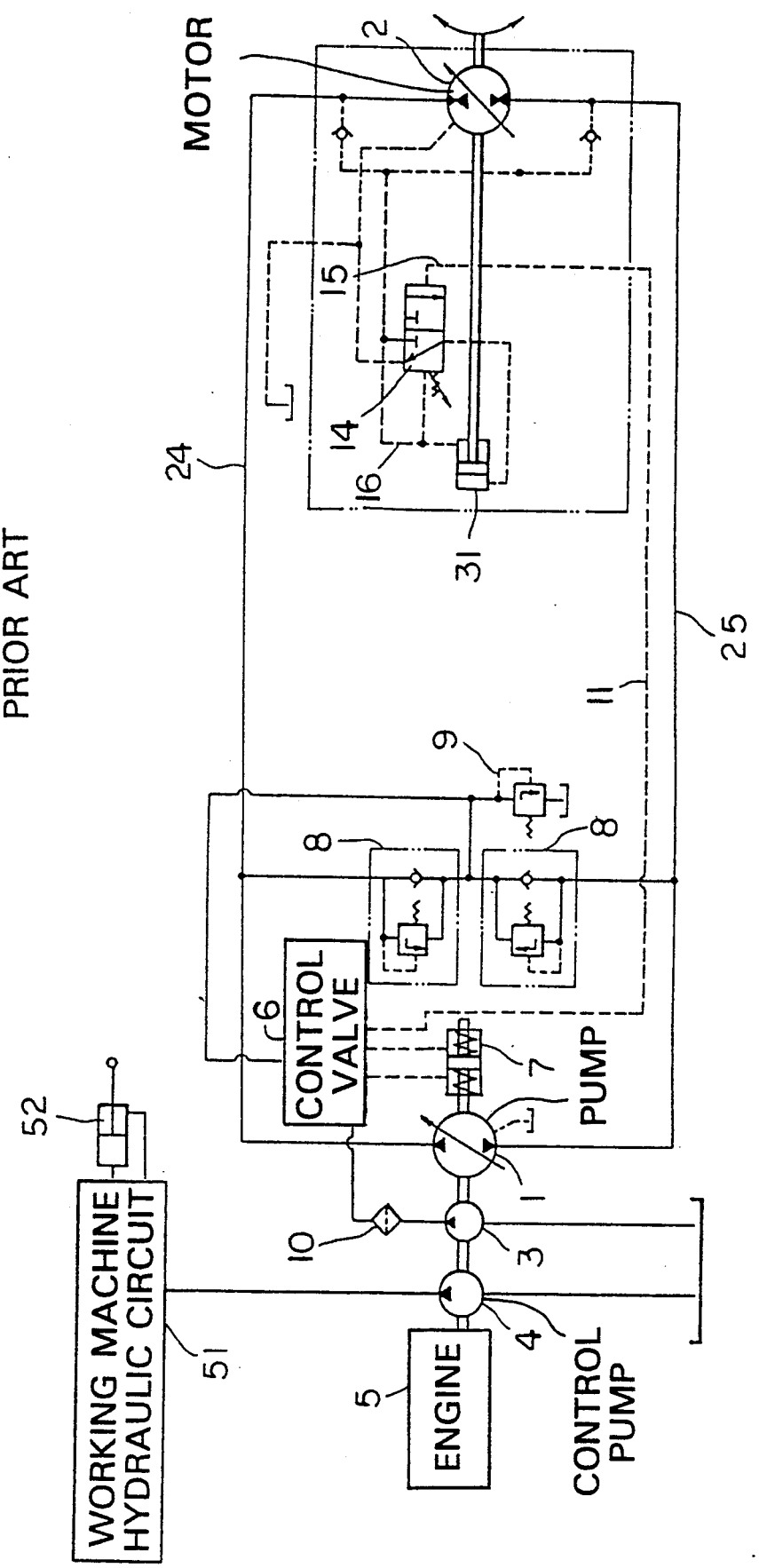
FIGS. 12 to 16 are views showing a conventional device and characteristics thereof.
Figure 13:
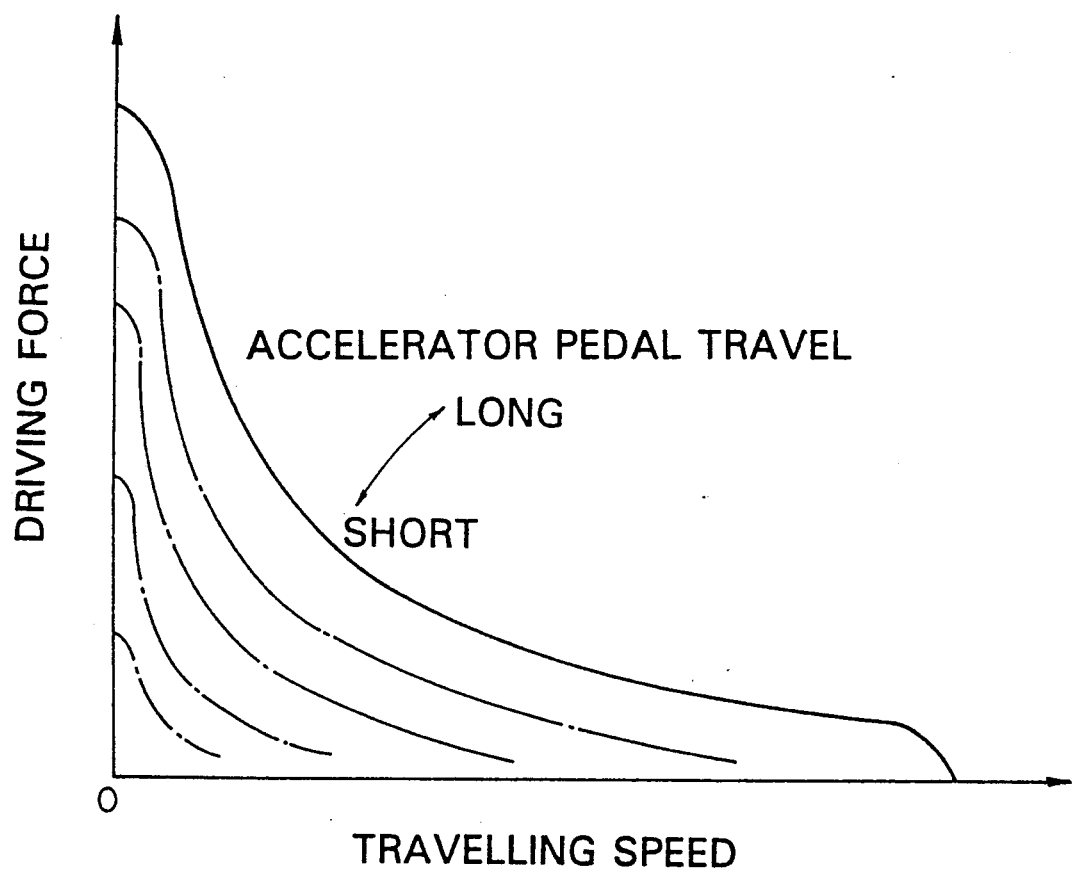

FIG. 1(a) is a hydraulic circuit diagram of an infinite variable-speed hydraulic drive vehicle employing a variable capacity hydraulic pump 1 and a motor 2 according to an embodiment of the present invention, in which elements same as those in the conventional hydraulic circuit shown in FIG. 12 are denoted by the same numerals and explanations thereof are omitted.

A main feature of the hydraulic circuit as illustrated in FIG. 1(a) resides in that a traveling speed cut-off device 200 is added to the conventional hydraulic circuit of FIG. 12. This device 200 includes a pressure reduction valve 201 provided in the pilot hydraulic piping 15 which supplies pressurized oil from the control pump 3 to the motor control valve 14 so that the pilot pressure to be applied to the motor control valve 14 is reduced.

A solenoid changeover valve 202 is provided for performing changeover between operation and non-operation of the pressure reduction means 201.

A changeover valve 203 is also provided for changing the pressure reduction valve 201 from operation state to non-operation state if the pressure in the main circuit 24,25 exceeds a preset valve $P_{H1}$ even if the pressure reduction valve 201 is changed over by the changeover valve 202 from the non-operation state to the operation state.

A resilient force of a pressure regulating spring of the pressure reduction valve 201 and a resilient force of a set pressure adjusting spring of the changeover valve 203 can be arbitrarily adjusted.

Figure 1B:
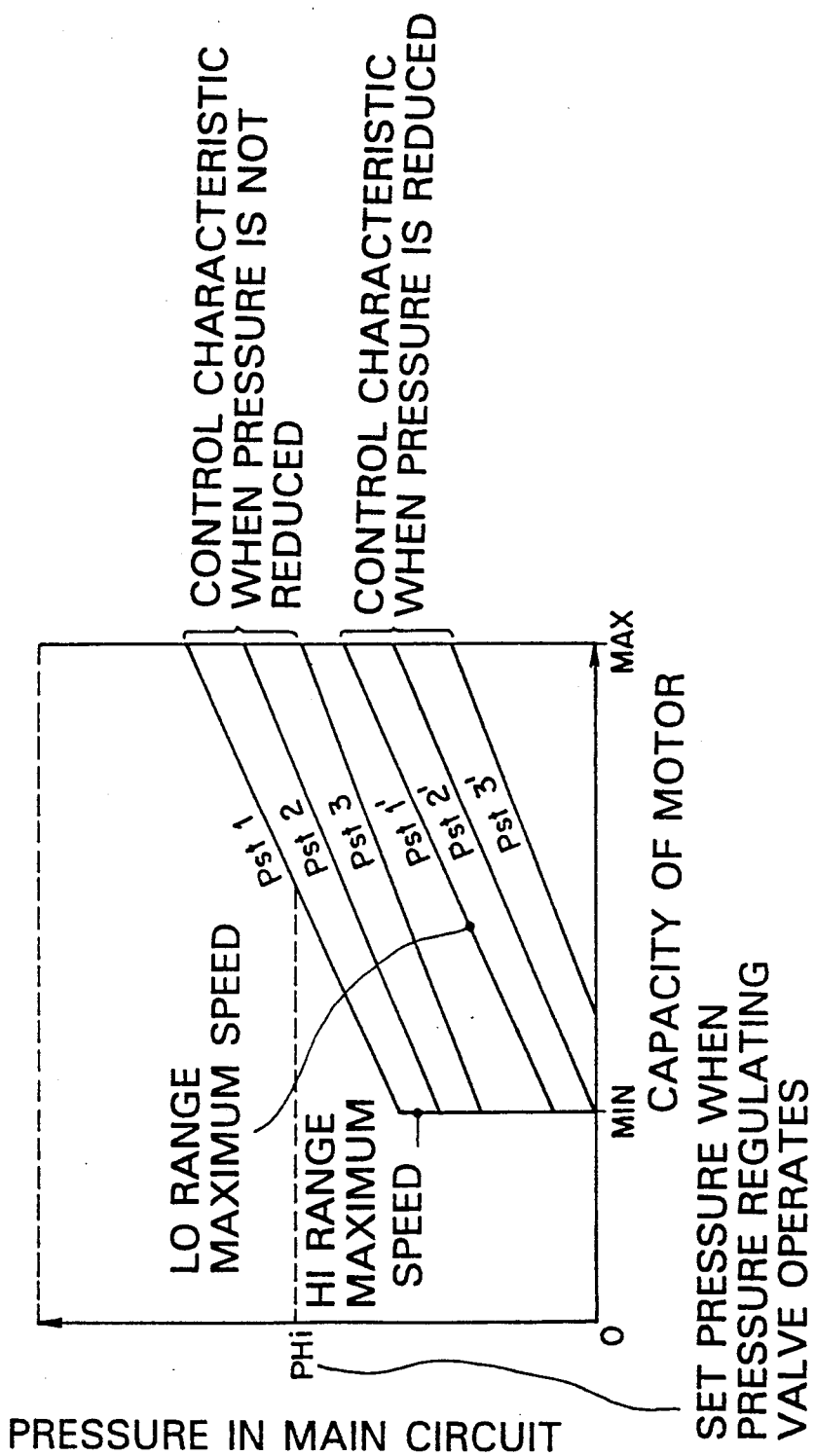
FIG. 1(b) is a graph showing an operation of the device.
Figure 1C:
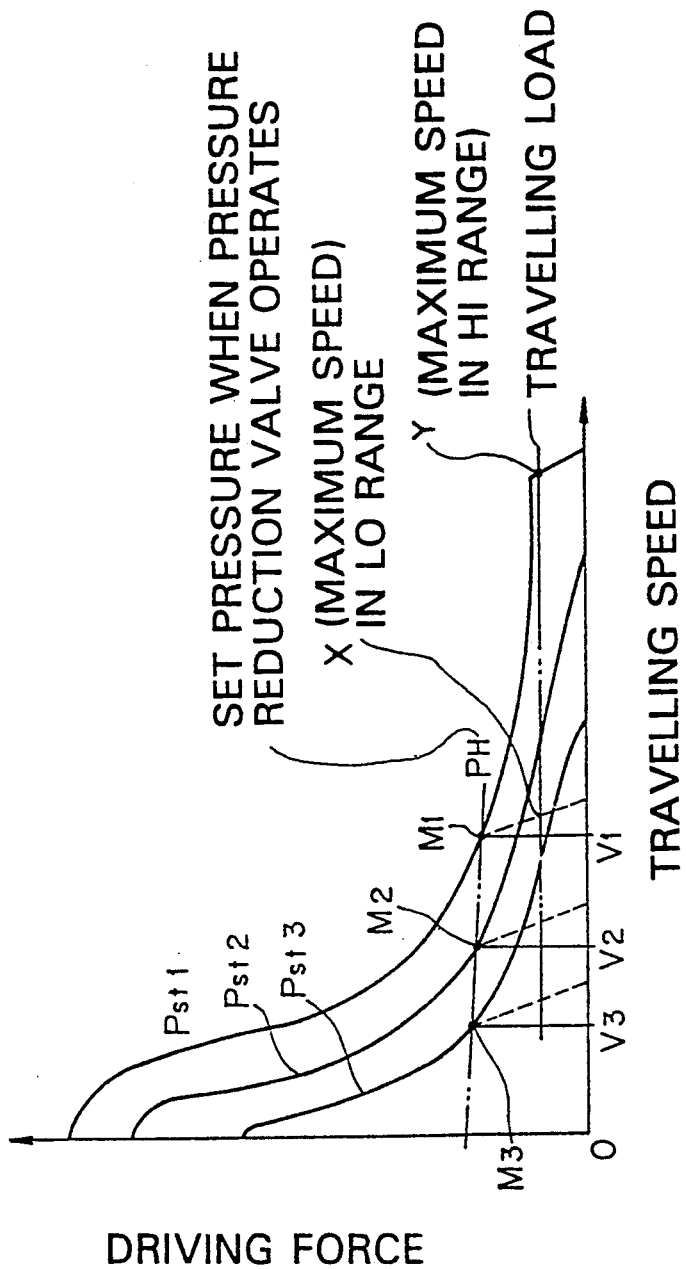
FIGS. 1(c) and 1(d) are graphs showing various characteristic of pressures.

The operation of the hydraulic circuit as illustrated in FIG. 1(a) will be described with reference to FIG. 1(b). The relation between the pressure $P_{H1}$ in the main circuit, and the capacity of the motor and the pilot pressure $P_{st}$ is as follows. At the state where the changeover valve 202 is closed (the pressure reduction valve 201 is in a non-operation state), there is established the relation represented by straight-lines $P_{st}1$, $P_{st}2$ .... At the state where the changeover valve 202 is opened (the pressure reduction valve 201 is then in an operation state) by activation of the solenoid thereof there is established the relation represented by straight lines $P_{st}1'$, $P_{st}2'$.... The pressure in the main circuit is a set pressure $P_{H1}$ of the changeover valve 203 and hence the pressure reduction valve 201 does not operate (that is, go to its operation state) when the pressure in the main circuit is higher than the pressure $P_{H1}$ so that the relation represented by the straight-lines $P_{st}1$, $P_{st}2$ ... is established whether the solenoid changeover valve 202 is closed or open. The traveling performance depends on a control characteristic of the motor and represented as illustrated in FIG. 1(c). At the set pressure $P_{H1}$ of the changeover valve 203, the traveling speed are represented as $V_1$, $V_2$ and $V_3$. If the driving force is greater than the matching points $M_1$, $M_2$ and $M_3$ between the driving force and the traveling speed, that is, the pressure in the main circuit is greater than the set pressure $P_{H1}$, the traveling performance is constant irrespective of the state of the solenoid changeover valve 202. However, when the driving force is less than the matching point $M_1$, namely, when the pressure in the main circuit is less than the set pressure $P_{H1}$, the pressure reduction valve 201 operates when the solenoid changeover valve 202 is opened, hence the characteristic of the motor is represented as $P_{st}1'$, $P_{st}2'$..., and the traveling performance is represented as illustrated in the broken lines in FIG. 1(c), whereby the maximum traveling speed is controlled.

Figure 1D:
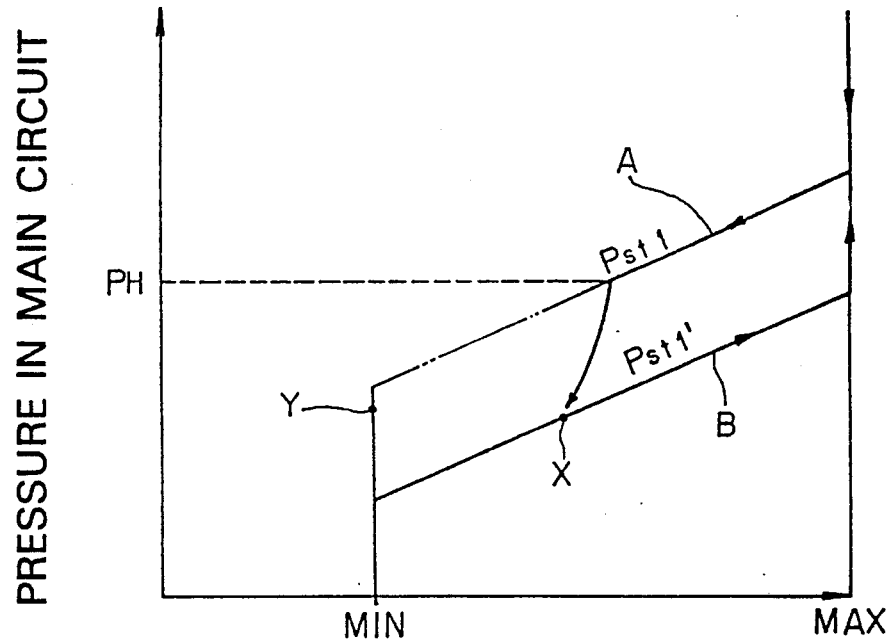

FIG. 1(d) is a graph showing a change of the capacity of the motor when the solenoid changeover valve 202 is opened and the control pressure is represented as $P_{st1}$, in the hydraulic circuit as illustrated in FIG. 1(a). When the traveling load is varied from large to small load, namely, when the traveling speed is varied from the low speed to high speed, the characteristic of the motor is represented as A. Since the control pressure is reduced when the pressure in the main circuit is less than the set value, the capacity of the motor is not varied to the minimum capacity but is reduced to the capacity where the motor capacity and the traveling pressure balances (X point) and is stabilized there. When the control pressure is not reduced, the capacity of the motor moves along the straight line of the pressure $P_{st1}$ and is varied to the minimum capacity of the motor and is finally varied to the point (Y) where it balances with the traveling pressure at the maximum traveling speed. A ratio of the capacity of the motor at the point X relative to that at the point Y determines the upper limit traveling speed of the low range speed (point X in FIG. 1(c)).

A characteristic B in FIG. 1(d) represents the characteristic of the motor when the traveling load is varied from the low to the high load, namely, the traveling speed is varied from the high speed (point X) to the low speed.

Figure 2:
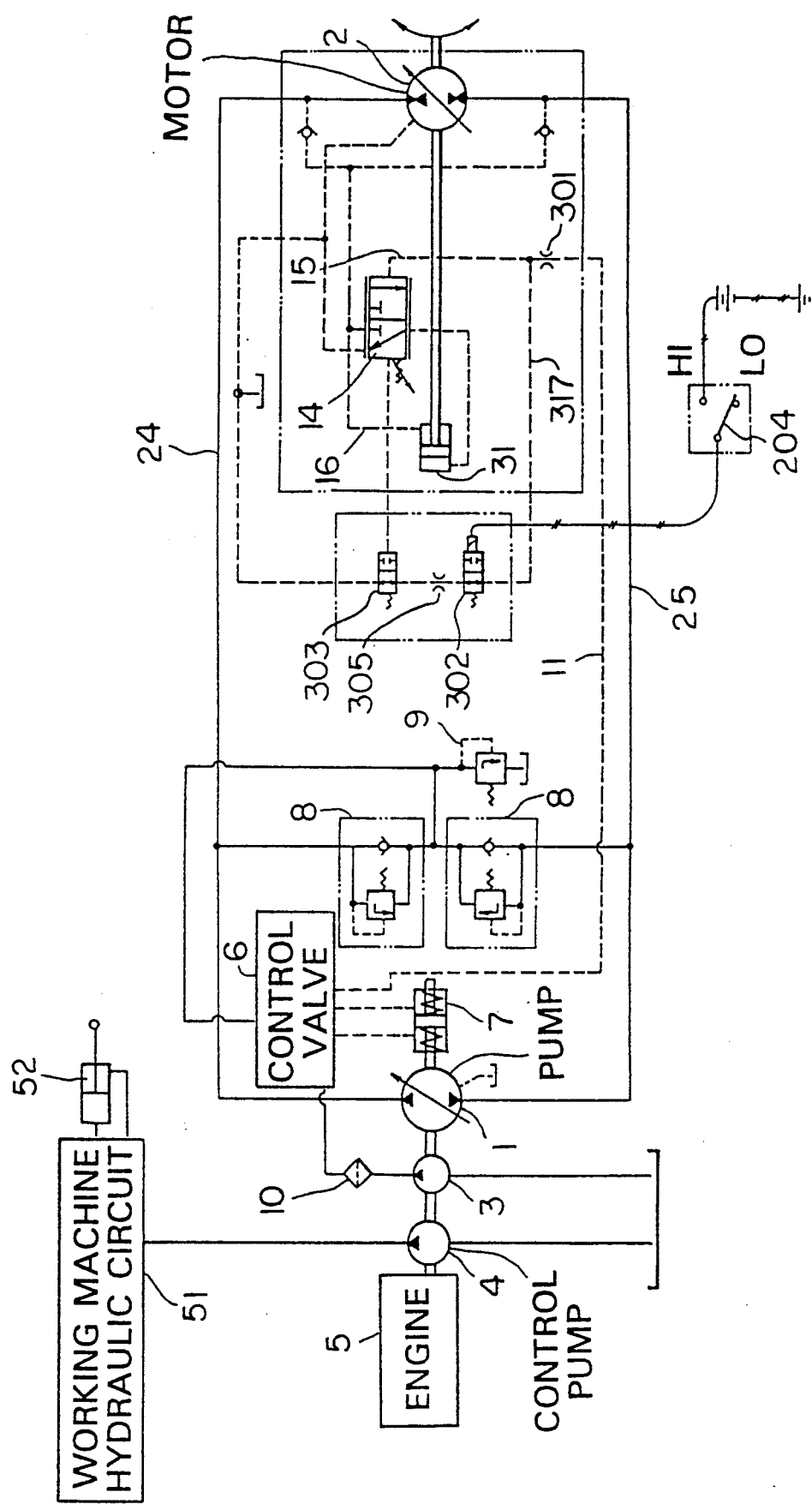
FIGS. 2 to 6 are hydraulic circuit diagrams according to other embodiments of the present invention.
Figure 3:
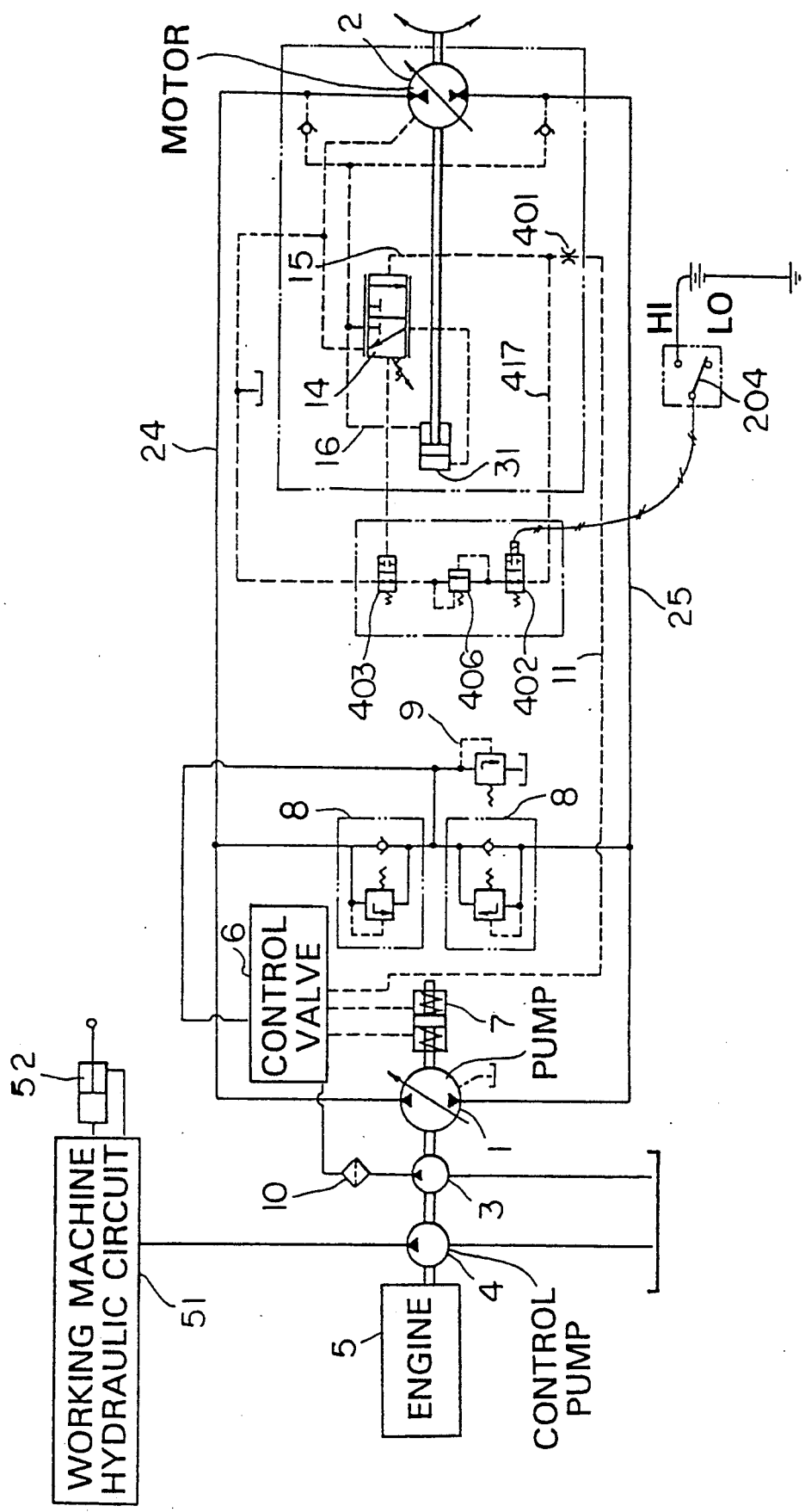

FIGS. 2 and 3 show another embodiment according to the present invention. In FIG. 2, a throttle valve 301 is provided at the pilot hydraulic piping 15 instead of the pressure reduction valve. There are also provided a bypass circuit 317 which communicates downstream of the throttle valve 301 with a tank and another throttle valve 305 which is positioned in the bypass circuit 317. With such an arrangement, the pressure of the oil at the upper stream of the throttle valve 301 is reduced by the difference between the pilot oil which passes the throttle valve 301 and the oil which passes the throttle valve 305, and the oil under reduced pressure is supplied to the motor control valve 14. A solenoid changeover valve 302 and a pilot hydraulic changeover valve 303 operate in the same way as the pressure reduction valve 201 as illustrated in FIG. 1(a) and are serially provided at the respective upper stream and the lowerstream end of the throttle valve 305.

In FIG. 3, a throttle valve 401 is provided at the pilot hydraulic piping 15 instead of the pressure reduction valve. There is also provided a bypass circuit 417 which communicates downstream of the throttle valve 401 with the tank and a pressure regulating valve 406 which is positioned in the bypass circuit 417.

With such an arrangement, the oil under pressure which is regulated by the pressure regulating valve 406 is supplied to the motor control valve 14 and the pressure of the oil upstream is reduced by the throttle valve 401. A solenoid changeover valve 402 and a hydraulic pilot changeover valve 403 operate in the same way as the pressure reduction valve 201 as illustrated in FIG. 1(a) and are provided serially at the respective upperstream and downstream ends of the pressure regulating valve 406.

Figure 4:
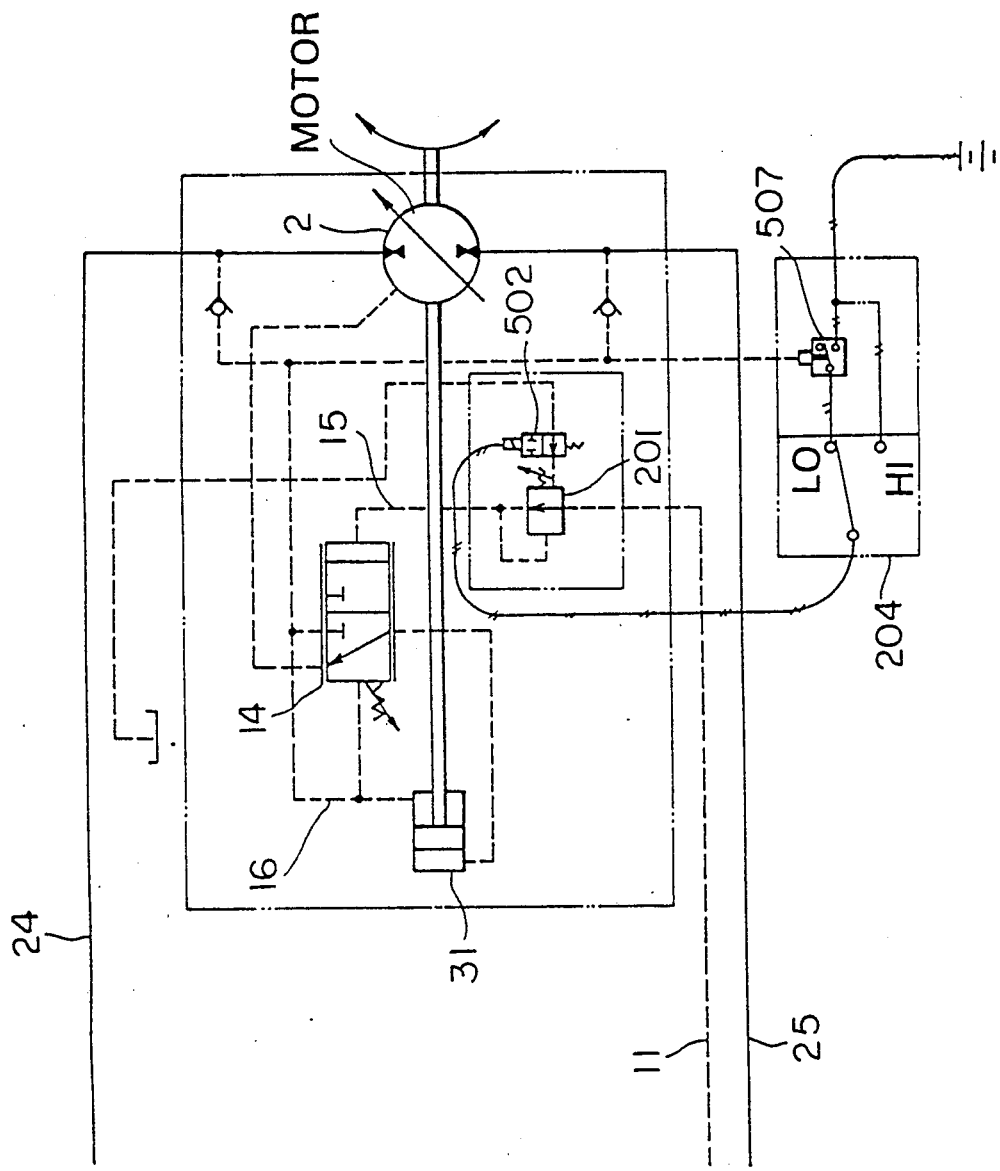

In an embodiment as illustrated in FIG. 4, there are provided a pressure detector 507 for detecting the oil pressure of the main circuit and a control circuit for switching over and controlling a solenoid changeover valve 502 by the operation of the pressure detector 507, instead of the pilot hydraulic changeover valves in FIGS. 1(a), 2 and 3. The changeover valve 502 is switched over to the direction where a pressure reduction means of the solenoid changeover valve 502 operates only at the time when the pressure is less than the preset value of the pressure in the main circuit in the same way as the pilot hydraulic changeover valve.

Figure 5:
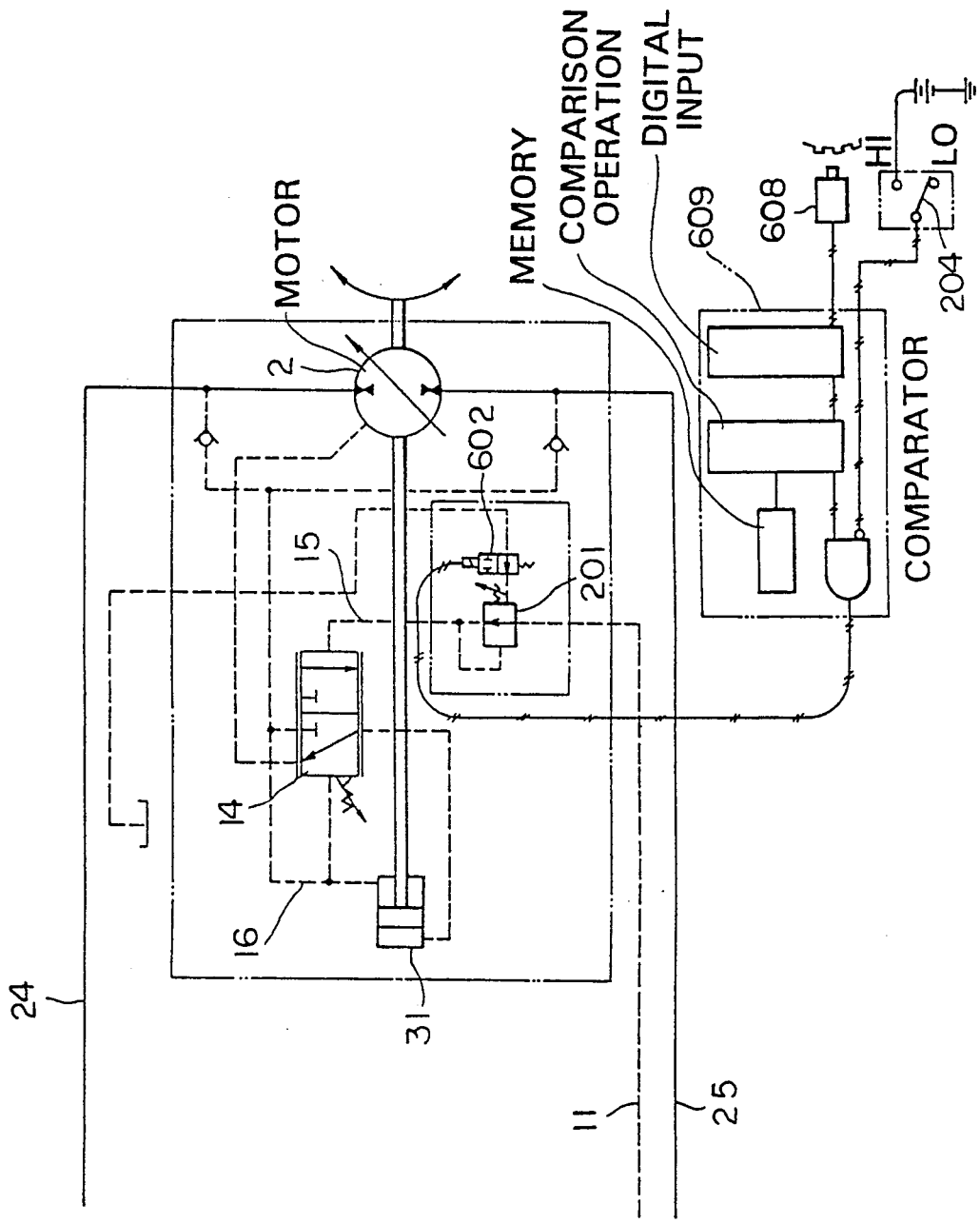

In the embodiment as illustrated in FIG. 5, there are provided, instead of the pressure detector for detecting the pressure of oil in the main circuit in FIG. 4, a traveling speed detector 608 for detecting the traveling speed and a control unit 609 for switching over and controlling a solenoid valve 602 in response to a signal issued by the traveling speed detector 608 wherein the changeover solenoid valve 602 is switched over to the direction where the pressure reduction means operates when the traveling speed exceeds the preset value of a low speed range in the same way as the pilot hydraulic changeover valve.

In the embodiments as illustrated in FIGS. 2 to 5, the maximum speed in the low speed range can be regulated by sectional areas of the throttle valves 301 and 305 and regulating pressure by the changeover valve 303 in the embodiment of FIG. 2, by regulating pressures by the pressure regulating valve 406 and the changeover valve 403 in the embodiment of FIG. 3, by regulating pressure by the pressure reduction means and set-valve of the main circuit which is detected by the pressure detector in the embodiment of FIG. 4 and by regulating pressure by the reduction means and the traveling speed control valve by the control unit 609 respectively.

These pressure reduction means which are controlled by the pressure detector in the main circuit or the traveling speed detector can be replaced by a solenoid pressure reduction valve (in the embodiment of FIG. 1(a)), a solenoid throttle valve (in the embodiment of FIG. 2) and a solenoid pressure regulating valve (in the embodiment of FIG. 3) all of which operate in the same manner as these pressure reduction means.

Figure 6:
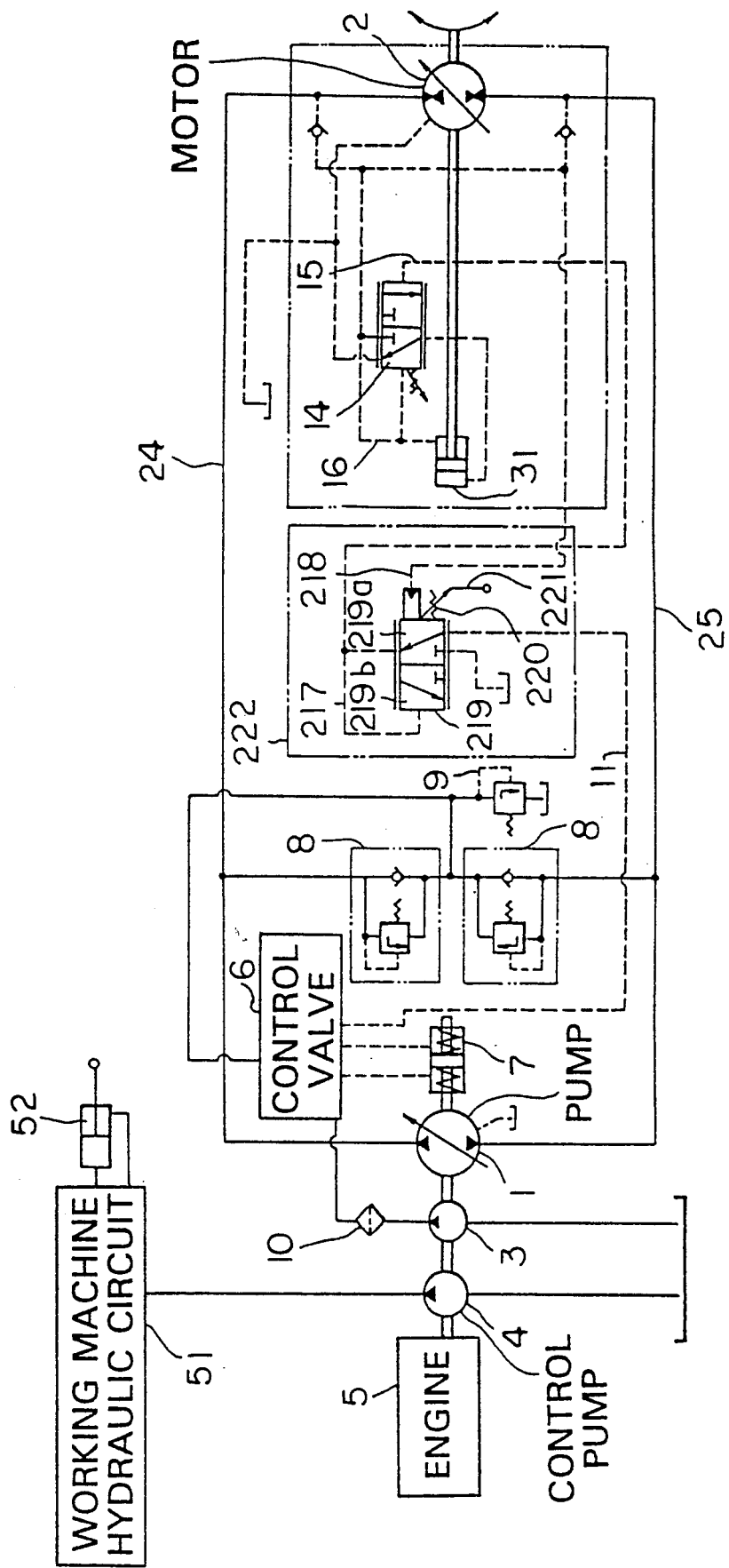

FIG. 6 is a view showing another embodiment of the present invention. Components which are the same as those in FIG. 12 are denoted by the same numerals and the explanations thereof are omitted. A feature of this embodiment resides in adding a traveling speed cut-off device 222 to the conventional hydraulic circuit as illustrated in FIG. 12. This embodiment comprises the pilot hydraulic piping 15 which supplies the oil under pressure from the control pump 3 to the motor control valve 14, a pilot hydraulic piping 217 which extends from the pilot hydraulic piping 15 and is connected to one end of a pressure reduction type pressure control valve 219 and a pilot hydraulic piping 218 which supplies the oil under pressure from the main circuit 24 or 25 at the high pressure side to the motor control valve 14 and is connected to another end of the reduction type pressure control valve 219.

The pressure control valve 219 is balanced by difference between the pressure in the pilot hydraulic piping 217 and the pressure in the pilot hydraulic piping 218 and a spring 220. Resilience force of the spring 220 can be arbitrarily adjusted by a lever 221.

Operations of the hydraulic circuit according to the embodiment set forth above will be described hereinafter.

Since a pressure $P_H$ of the main circuit 24 or 25 at the high pressure side (hereinafter referred to as main circuit pressure) is also applied to the pilot hydraulic piping 218, the pressure in the pilot hydraulic piping 217 is controlled by switching over the pressure regulating valve 219 to a position 219a in case the following expression is established $$P_{st}A \leqq P_H \cdot B + F \qquad (1)$$

while the pressure in the pilot hydraulic piping 217 is controlled by switching over the pressure regulating valve 219 to a position 219b in case the following expression is established.

$$P_{st}A > P_H \cdot B + F \qquad (2)$$

where $P_{st}$ is a control pressure in the pilot hydraulic piping 217, F is a resilient force of the spring 220, B is an area of the pressure control valve 219 for receiving the pressure at the side of the pilot hydraulic piping 218, and A is an area of the pressure control valve 219 for receiving the pressure at the pilot hydraulic piping 217.

Figure 7:
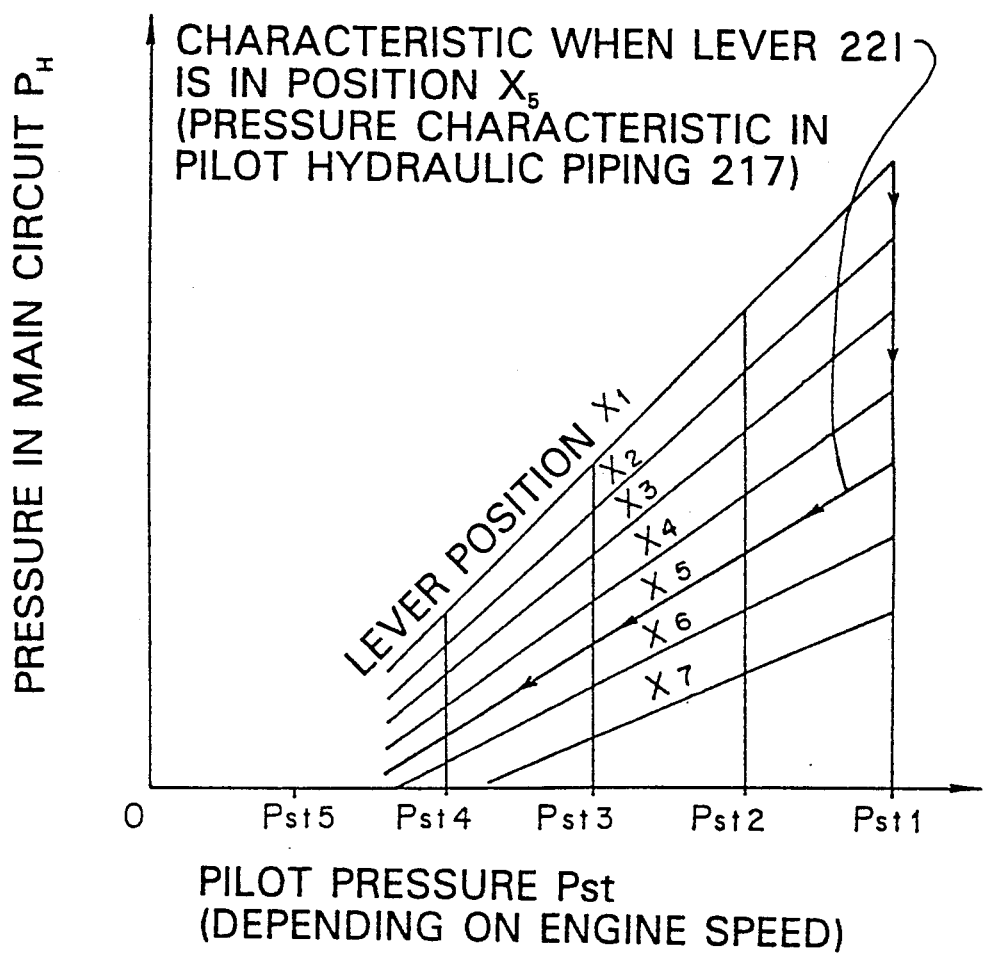
FIG. 7 is a graph showing a characteristic of a pressure control valve in FIG. 6.
Figure 8:
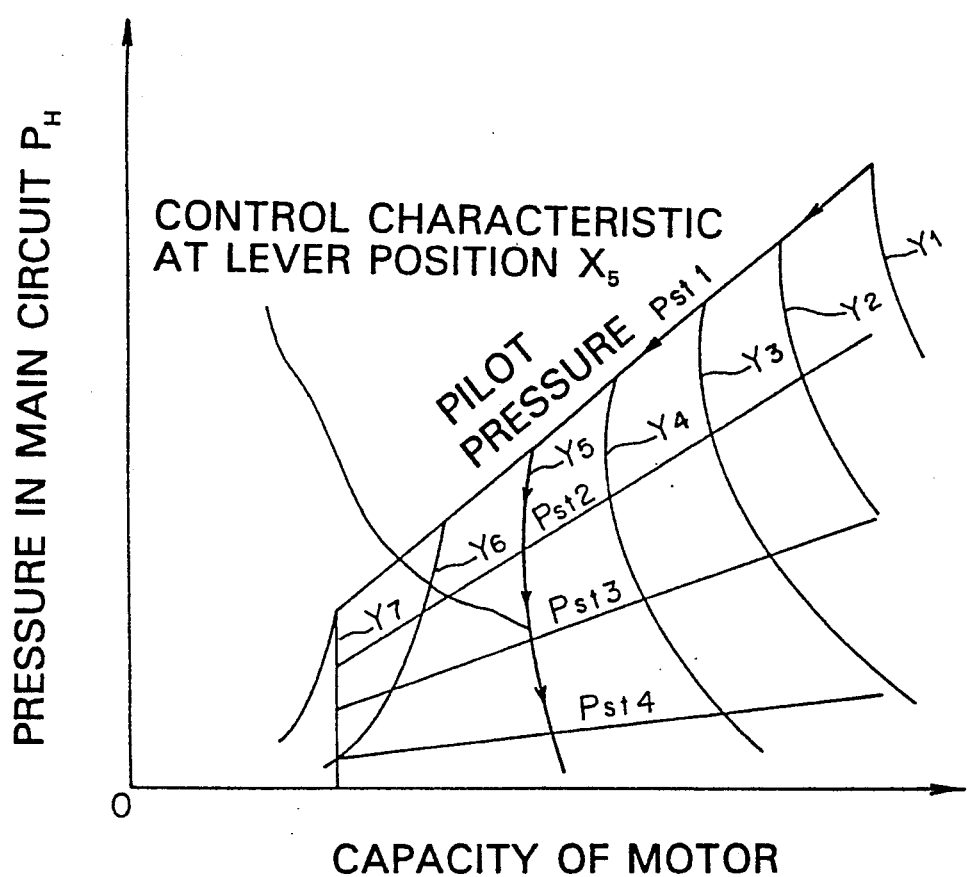
FIG. 8 is a graph showing a control characteristic of the variable capacity hydraulic motor of the hydraulic circuit in FIG. 6.
Figure 9:
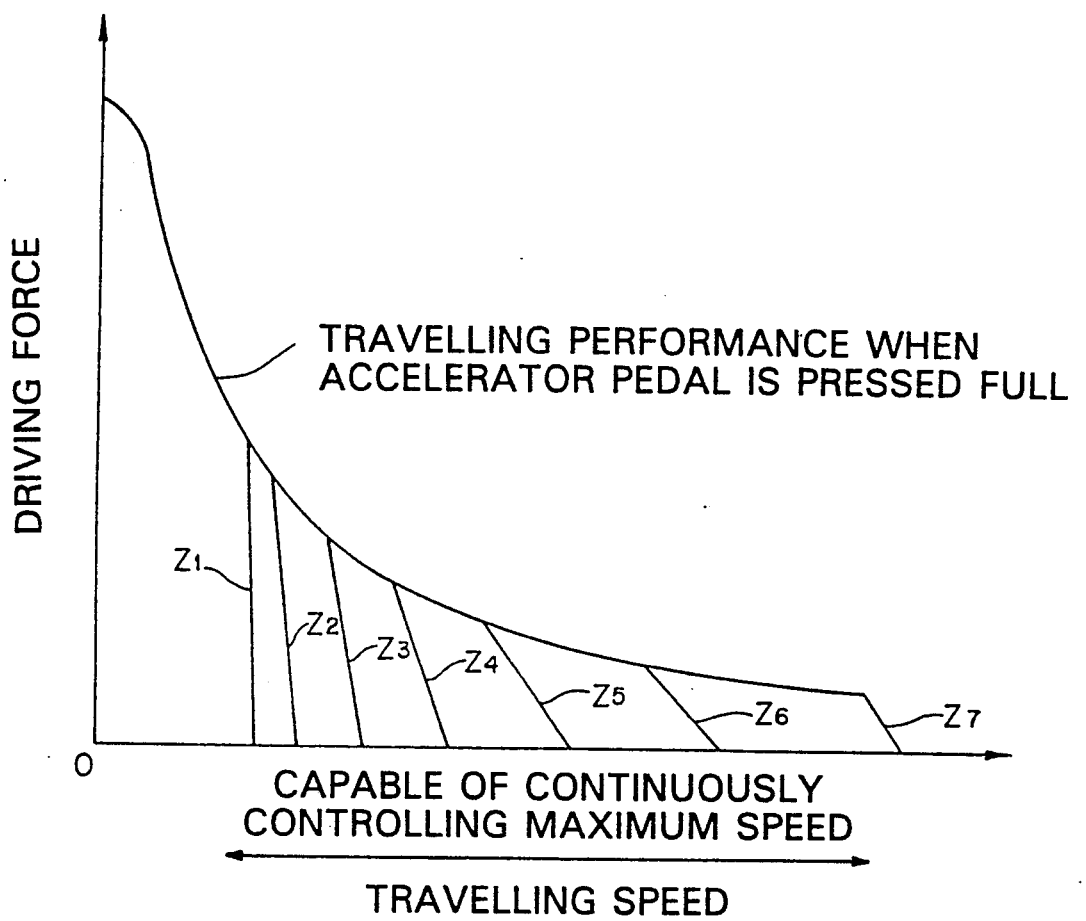
FIG. 9 is a graph showing the control of the maximum traveling speed of the hydraulic drive vehicle employing the hydraulic circuit in FIG. 6, FIGS. 10 and 11 are views showing other embodiments of a traveling speed cut-off device.
Figure 14:
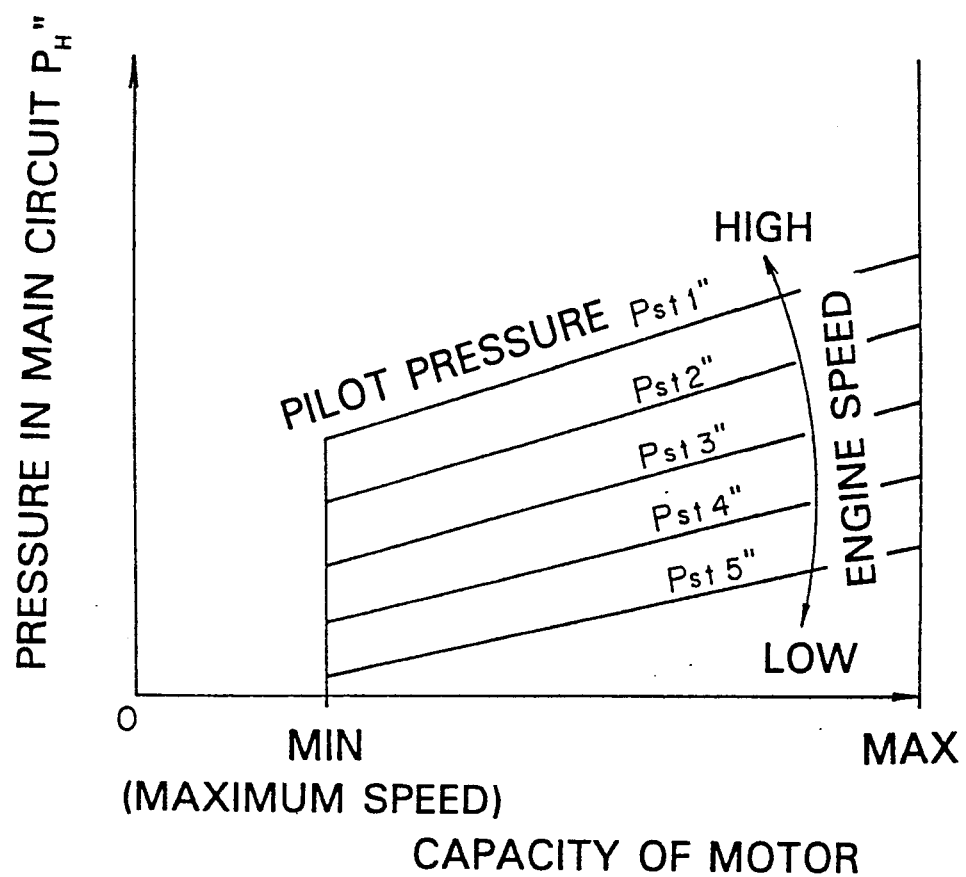
Figure 15:
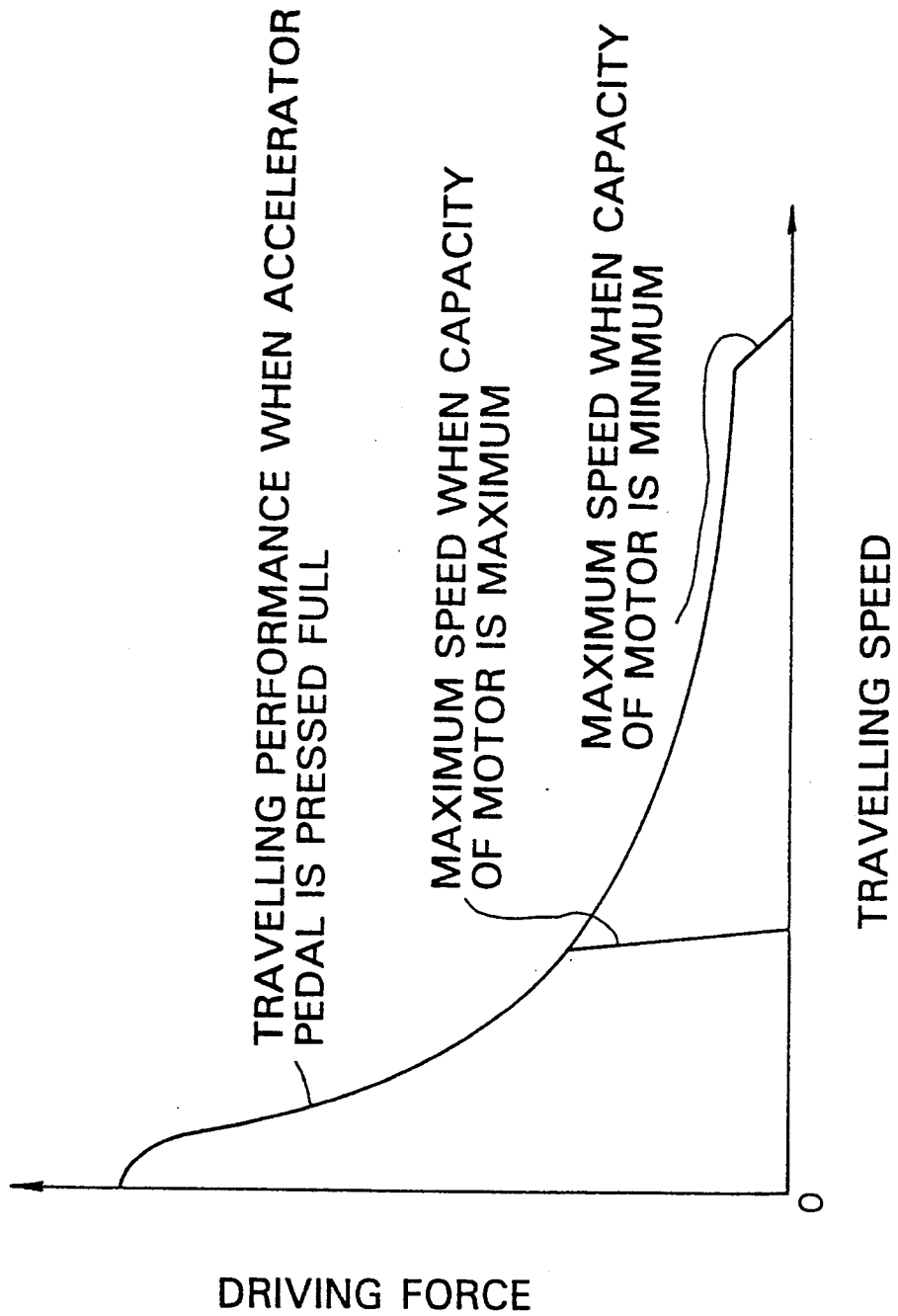
Figure 16:
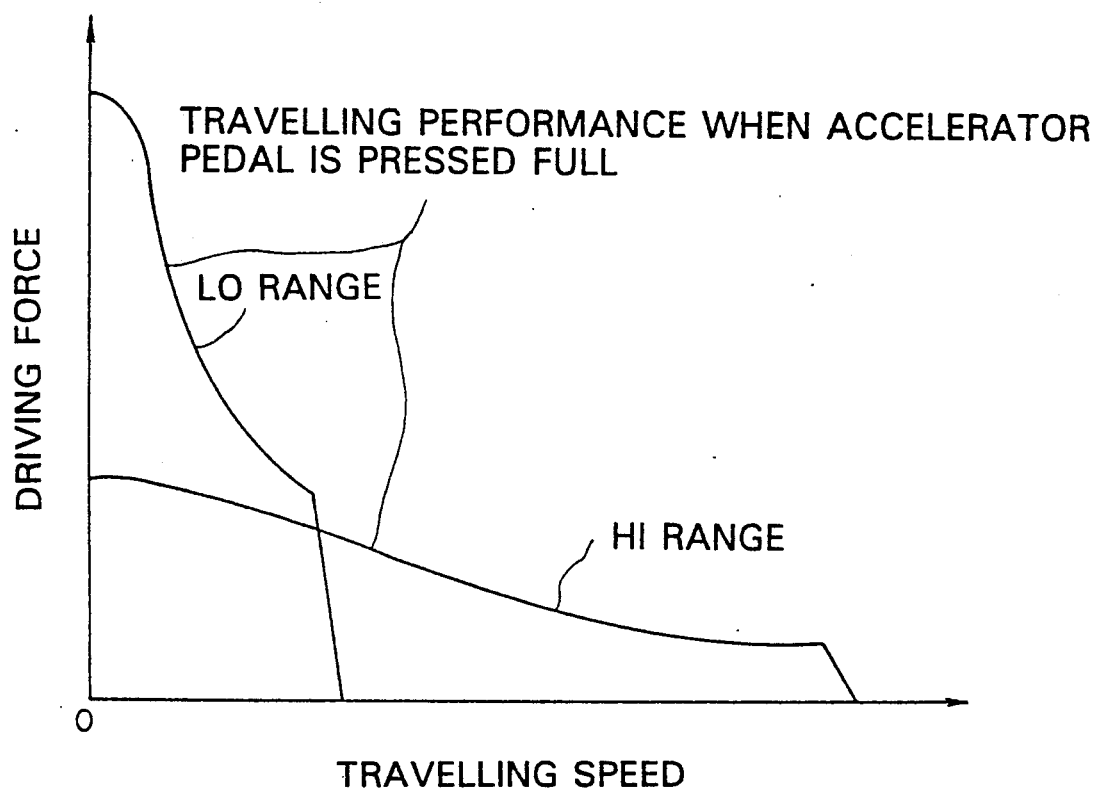

A characteristic of the pressure control valve 219 is illustrated in FIG. 7. In the same figure, straight lines $X_1$, $X_2$, $X_3$ . . . show the characteristic when the pressure regulating valve 219 is switched over from the position 219a to the position 219b, which is continuously varied when the spring 220 is operated by the lever 221. A graph in FIG. 8 represents the relation between the main circuit pressure $P_H$ in the hydraulic circuit in FIG. 6, the capacity of the motor and the pilot pressure $P_{st}$, i.e. the control characteristic of the variable capacity hydraulic motor 2 and corresponds to the graph in FIG. 14 of the conventional hydraulic circuit in FIG. 12. As evident from the graph in FIG. 8, the capacity of the motor is minimum at the matching lines $Y_1$, $Y_2$, $Y_3$ . . . . Since the minimum capacity of the motor can be controlled arbitrarily, it is possible to control the maximum traveling speed continuously between $Z_1$ to $Z_7$ as illustrated in FIG. 9.

Figure 10:
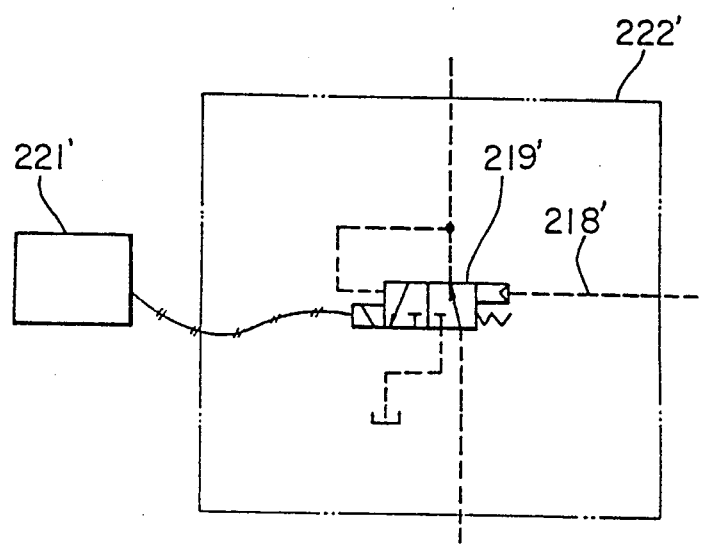

FIG. 10 is a view showing another embodiment of the present invention. In this embodiment, only a traveling speed cut-off device 222' is illustrated in which the traveling speed cut-off device 222 in FIG. 6 is replaced by the traveling speed cut-off device 222' and a pressure reduction type solenoid pressure control valve 219 in FIG. 6 is replaced by the same as denoted at 219' and the lever 221 in FIG. 6 is replaced by a control device 221'. The same characteristic as illustrated in FIG. 8 is obtained in response to the instruction current by the control device 221'.

Figure 11:
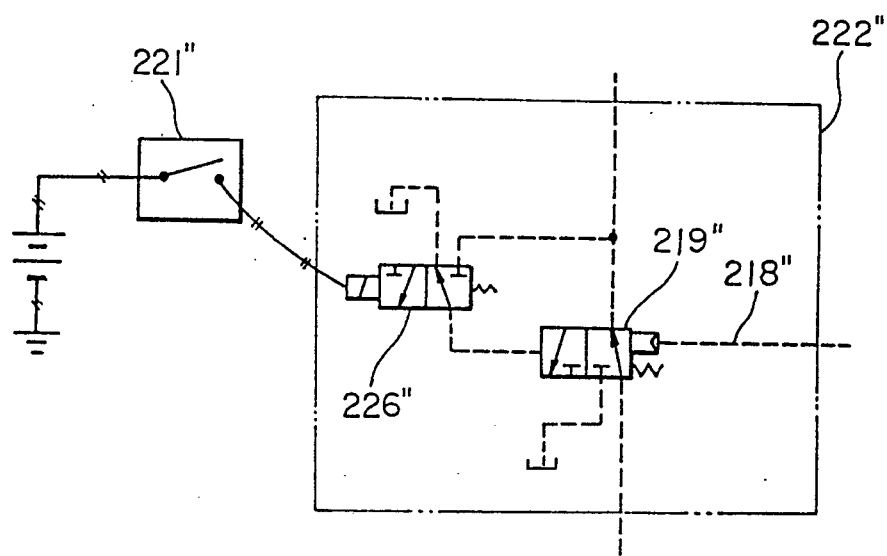

FIG. 11 is a view of still another embodiment of the present invention. In this embodiment, only a traveling speed cut-off device 222" is illustrated in which the traveling speed cut-off device 222 in FIG. 6 is replaced by the traveling speed cut-off device 222" and the lever 221 in FIG. 6 is replaced by a solenoid changeover valve 226" and a changeover switch 221", wherein the changeover switch 221" is switched over so as to switch over to only one of the positions in FIG. 8.

The following conspicuous effects can be obtained by the present invention having the arrangement as set forth above in detail.

(1) Since the traveling speed alone can be arbitrarily regulated while the traveling performance, which is the feature of the infinite variable-speed hydraulic drive vehicle, is maintained, it is possible to obtain the optimum speed for the working condition, thereby remarkably improving the matching between the loading or working speed and the traveling speed.

(2) When the traveling speed is slower than the controlled speed according to the speed control means of the present invention, it is possible to obtain the same traveling performance as that which is obtained when the traveling speed is not controlled, hence the traveling performance is not influenced by the variation of the main circuit pressure.

(3) Since the pressure reduction means for reducing the control pressure for determining the traveling speed and the changeover means for switching over the pressure reduction means by the main circuit pressure (or traveling speed) are separately provided, it is possible to structure the present device by the existing devices, which can be realized at relatively low cost and can be adjusted with ease.

In case that pressure reduction type pressure control valve is provided in series in the motor control circuit, when the pressure regulating valve is positioned at the position 219b (when pressure is reduced), it is possible to lessen the pressure reduction in the upstream circuit, which dispenses with a fixed orifice, thereby improving a response of the variation of the capacity of the motor relative to the variation of the motor control pressure.

As mentioned above, according to the present invention, the matching between the traveling speed and the loading speed are suitably made under the working condition. The traveling performance is not influenced by the variation of the main circuit pressure, hence is suitably employed in the device for controlling variable capacity motor of hydraulic drive vehicle, the maximum traveling speed of which should be controlled in response to the working condition.

I claim:

1. In a vehicle hydraulic drive device having a variable capacity hydraulic drive pump driven from an engine, a variable capacity hydraulic motor driven from the hydraulic drive pump, a main fluid supply circuit connected between the drive pump and the motor for supplying pressure fluid to the motor to effect driving thereof, pump control valve means for controlling the capacity of the drive pump, a control pump driven from the engine and having a fluid pressure outlet communicating with said pump control valve means, fluid pressure cylinder means coupled to said motor for varying the capacity thereof, motor control valve means for controlling flow of pressure fluid from said main circuit to said cylinder means to control activation thereof, and a pilot pressure conduit connected to said motor control valve means for supplying pilot pressure fluid from said control pump to a pilot of said motor control valve means to control shifting thereof, the improvement comprising fluid flow cut-off valve means connected in series with said pilot pressure conduit to open and close said pilot pressure conduit for controlling flow of pilot pressure fluid to a pilot of said motor control valve means, and a pilot control conduit connected between a first pilot of said cut-off valve means and said main circuit for supplying pressure fluid therethrough for controlling said cut-off valve means.

2. A device according to claim 1, wherein said cut-off valve means is a pressure reduction-type pressure valve having said control conduit connected to said first pilot at one end thereof, and said pilot pressure conduit downstream of said pressure valve having a pilot conduit portion connected to a second pilot at the other end of said pressure valve.

3. A device according to claim 2, including a solenoid-actuated changeover valve associated with said pilot conduit portion for controlling flow of pressure fluid therethrough.

4. A device according to claim 1, including adjustable biasing means for normally urging the pressure valve into an open position wherein upstream and downstream portions of said pilot pressure conduit are in fluid communication with one another.

* * * * *